(12) United States Patent
Arikatla et al.

(10) Patent No.: US 11,620,276 B1
(45) Date of Patent: Apr. 4, 2023

(54) BACKGROUND JOB BASED FULFILLMENT FOR MANAGED ACCOUNT OBJECTS

(71) Applicant: Snowflake Inc., Bozeman, MT (US)

(72) Inventors: Durga Mahesh Arikatla, San Jose, CA (US); Laxman Mamidi, Redwood City, CA (US); Subramanian Muralidhar, Mercer Island, WA (US); Chieh-Sheng Wang, San Mateo, CA (US); Di Wu, Newark, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/661,431

(22) Filed: Apr. 29, 2022

(51) Int. Cl.
  *G06F 16/23* (2019.01)
  *G06F 16/27* (2019.01)
(52) U.S. Cl.
  CPC .......... *G06F 16/2365* (2019.01); *G06F 16/27* (2019.01)
(58) Field of Classification Search
  CPC .............................. G06F 16/27; G06F 16/2365
  USPC ........................................................ 707/690
  See application file for complete search history.

(56) References Cited

U.S. PATENT DOCUMENTS 10,824,640 B1 * 11/2020 Chen ................... G06F 16/27
2021/0318998 A1 * 10/2021 Filip .................. G06F 16/245

* cited by examiner

*Primary Examiner* — Robert W Beausoliel, Jr.
*Assistant Examiner* — Arthur Ganger
(74) *Attorney, Agent, or Firm* — Schwegman Lundberg & Woessner, P.A.

(57) ABSTRACT

A process of fulfilling a database deployment request for a data platform. A compute service manager of the data platform scans one or more accounts of a consumer region of the data platform for a pending listing fulfillment request, where the pending listing request includes a request for deployment of a consumer database and an associated share of grant metadata of the consumer database within the consumer region. When the compute service manager determines that an account of the one or more accounts has a pending listing fulfillment request, the compute service manager determines a listing for the pending listing fulfillment request based on listing data of the account. The compute service manager determines that no other fulfillment task is scheduled for the pending listing fulfillment request and schedules a background fulfillment task to perform the fulfillment process for the pending listing fulfillment request.

30 Claims, 8 Drawing Sheets

BACKGROUND JOB BASED FULFILLMENT FOR MANAGED ACCOUNT OBJECTS

TECHNICAL FIELD

Embodiments of the disclosure relate generally to databases and, more specifically, to deployment fulfillment and database refreshing.

BACKGROUND

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

In many implementations, a data platform includes one or more databases that are maintained on behalf of a customer account. Indeed, the data platform may include one or more databases that are respectively maintained in association with any number of customer accounts, as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata in association with the data platform in general and in association with, as examples, particular databases and/or particular customer accounts as well.

Users and/or executing processes that are associated with a given customer account may, via one or more types of clients, be able to cause data to be ingested into the database, and may also be able to manipulate the data, add additional data, remove data, run queries against the data, generate views of the data, and so forth.

In example implementations of a data platform, a given database is represented as an account-level object within a customer account, and the customer account may also include one or more other account-level objects such as users, roles, and/or the like. Furthermore, a given account-level database object may itself contain one or more objects such as tables, schemas, views, streams, tasks, and/or the like. A given table may be organized as records (e.g., rows) that each include one or more attributes (e.g., columns). A data platform may physically store database data in multiple storage units, which may be referred to as blocks, micro-partitions, and/or by one or more other names.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
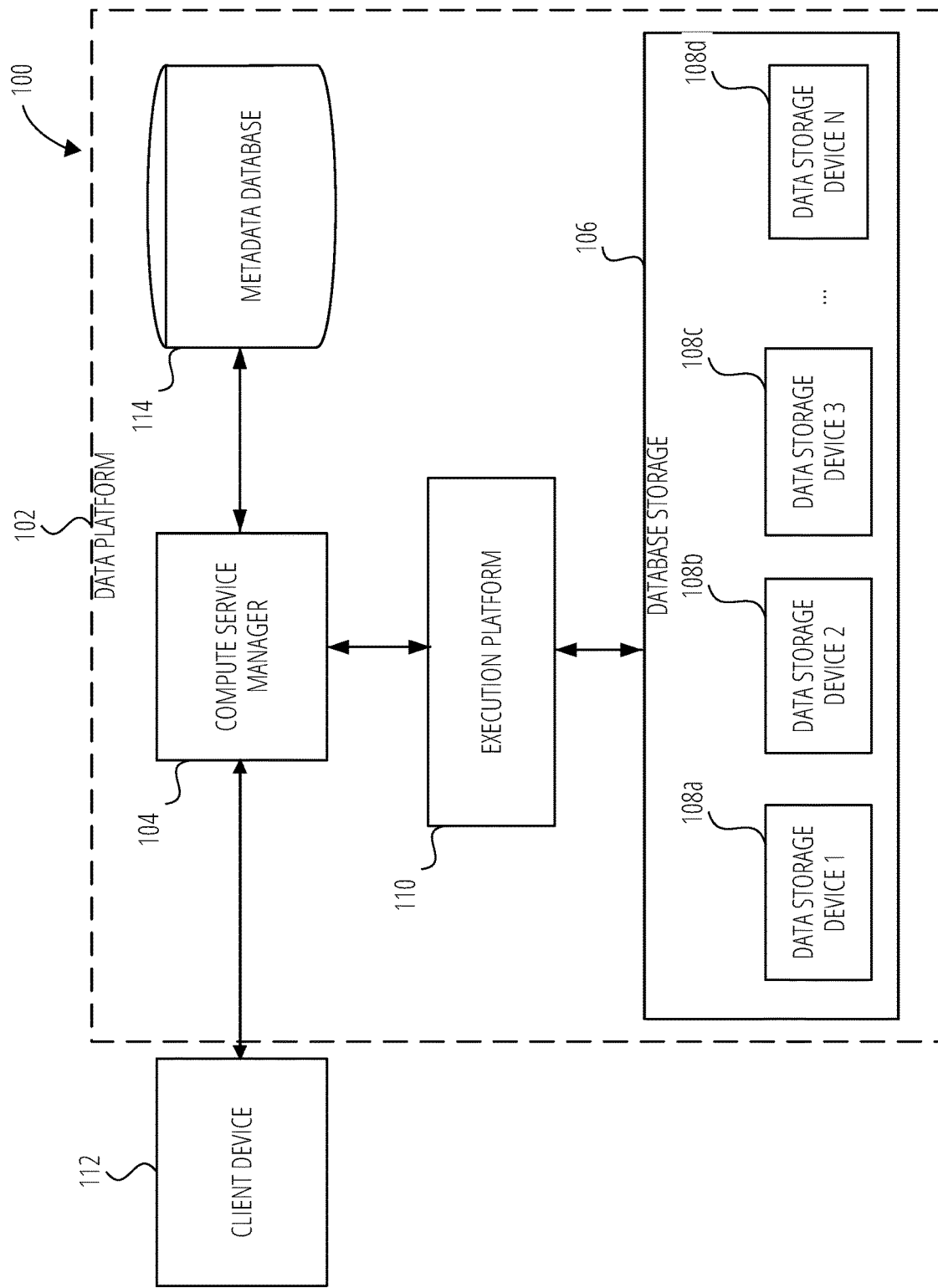
FIG. 1 illustrates an example computing environment that includes a network-based data platform in communication with a cloud storage provider system, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In some instances, it may be beneficial to replicate database data across multiple geographic locations, across multiple database vendors or providers, and/or across multiple computing devices that may be located in the same physical location or in two or more different locations. These multiple locations, vendors, providers, and/or computing devices may be referred to herein as "deployments." This may provide significant benefits to a database client because the data is backed up in more than one location. In the event that one deployment is unavailable due to, for example, a power outage, a system error, a scheduled maintenance downtime, and so forth, a failover process ensures a different deployment takes over the management and operation of the database.

Once replicated, a database and its related entities are refreshed on a periodic basis in order to keep the databases current. The refresh process is similar to the initial fulfillment process that created the database and its related entities. As the fulfillment process and the refresh process are similar, computational efficiencies are achieved by coordinating fulfillment processes and refresh processes in tasks that execute in the background and according to a schedule. Additional efficiencies are achieved through using replication groups that associate related entities together.

In example embodiments, a data platform receives a request to replicate a primary account to a secondary account. Based on the request, the data platform accesses account data of the primary account. The account data can include account-level objects such as users, roles, and the like, as well as one or more security configurations. The security configurations can include: an identity management configuration that defines user and role provisioning features for the primary account such as a System for Cross-Domain Identity Management (SCIM) configuration; an authorization configuration that defines resource access authorizations for the primary account such as an Open Authorization (OAuth) configuration; and an authentication configuration that defines access credential authentication features for the primary account such as a Security Assertion Markup Language (SAML) Single Sign-On (SSO) configuration. The data platform uses the account data to replicate the primary account, which results in the secondary account.

In example embodiments, a compute service manager of a data platform scans one or more accounts of a consumer region of the data platform for a pending listing fulfillment request. The pending listing request includes a request for deployment of a consumer database and an associated share of grant metadata of the consumer database within the consumer region. The compute service manager determines that an account of the one or more accounts has a pending listing fulfillment request and determines a listing for the pending listing fulfillment request based on listing data of the account. The compute service manager checks to determine if another fulfillment task is scheduled for the pending listing fulfillment request and if not, a background fulfillment task is scheduled to perform a fulfillment process for the pending listing fulfillment request.

In additional example embodiments, the compute service manager creates a share replication group including the share and a database replication group including the database and associates the share replication group and the database replication group with a remote managed account of the consumer region. The compute service manager triggers an initial remote replication group refresh of the database replication group and the share replication group by an automated refresh task, whereby the consumer database and the share are created in the consumer region and linked to the listing.

In additional example embodiments, the compute service manager schedules a refresh of the database replication group by the automated refresh task.

In additional example embodiments, the compute service manager determines to refresh the consumer database based on a schedule maintained by a scheduler. In order to perform the refresh, the compute service manager creates a replica database in the consumer region, copies data of the provider database into the replica database, and links the replica database as the consumer database to the listing.

In additional example embodiments, the compute service manager schedules a refresh of the share replication group by the automated refresh task.

In additional example embodiments, the compute service manager determines to refresh the share based on a schedule maintained by a scheduler. To perform the refresh, the compute service manager creates a replica share in the consumer region, generates data of the share based on the consumer database, and links the replica share to the listing as the share associated with the consumer database.

Other technical features may be readily apparent to one skilled in the art from the following figures, descriptions, and claims.

FIG. 1 illustrates an example computing environment 100 that includes a data platform 102 in communication with a client device 112, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein.

As shown, the data platform 102 comprises a database storage 106, a compute service manager 104, an execution platform 110, and a metadata database 114. The database storage 106 comprises a plurality of computing machines and provides on-demand computer system resources such as data storage and computing power to the data platform 102. As shown, the database storage 106 comprises multiple data storage devices, namely data storage device 1 108a to data storage device N 108d. In some embodiments, the data storage devices 1 to N are cloud-based storage devices located in one or more geographic locations. For example, the data storage devices 1 to N may be part of a public cloud infrastructure or a private cloud infrastructure. The data storage devices 1 to N may be hard disk drives (HDDs), solid state drives (SSDs), storage clusters, Amazon S3™ storage systems or any other data storage technology. Additionally, the database storage 106 may include distributed file systems (e.g., Hadoop Distributed File Systems (HDFS)), object storage systems, and the like.

The data platform 102 is used for reporting and analysis of integrated data from one or more disparate sources including the storage devices 1 to N within the database storage 106. The data platform 102 hosts and provides data reporting and analysis services to multiple customer accounts. Administrative users can create and manage identities (e.g., users, roles, and groups) and use permissions to allow or deny access to the identities to resources and services. Generally, the data platform 102 maintains numerous customer accounts for numerous respective customers. The data platform 102 maintains each customer account in one or more storage devices of the database storage 106. Moreover, the data platform 102 may maintain metadata associated with the customer accounts in the metadata database 114. Each customer account includes multiple data objects with examples including users, roles, permissions, stages, and the like.

The compute service manager 104 coordinates and manages operations of the data platform 102. The compute service manager 104 also performs query optimization and compilation as well as managing clusters of compute services that provide compute resources (also referred to as "virtual warehouses"). The compute service manager 104 can support any number and type of clients such as end users providing data storage and retrieval requests, system administrators managing the systems and methods described herein, and other components/devices that interact with compute service manager 104. As an example, the compute service manager 104 is in communication with the client device 112. The client device 112 can be used by a user of one of the multiple customer accounts supported by the data platform 102 to interact with and utilize the functionality of the data platform 102. In some embodiments, the compute service manager 104 does not receive any direct communications from the client device 112 and only receives communications concerning jobs from a queue within the data platform 102.

The compute service manager 104 is also coupled to metadata database 114. The metadata database 114 stores data pertaining to various functions and aspects associated with the data platform 102 and its users. In some embodiments, the metadata database 114 includes a summary of data stored in remote data storage systems as well as data available from a local cache. Additionally, the metadata database 114 may include information regarding how data is organized in remote data storage systems (e.g., the database storage 106) and the local caches. The metadata database 114 allows systems and services to determine whether a piece of data needs to be accessed without loading or accessing the actual data from a storage device.

The compute service manager 104 is further coupled to the execution platform 110, which provides multiple computing resources that execute various data storage and data retrieval tasks. The execution platform 110 is coupled to the database storage 106. The execution platform 110 comprises a plurality of compute nodes. A set of processes on a compute node executes a query plan compiled by the compute service manager 104. The set of processes can include: a first process to execute the query plan; a second process to monitor and delete micro-partition files using a least recently used (LRU) policy and implement an out of memory (OOM) error mitigation process; a third process that extracts health information from process logs and status to send back to the compute service manager 104; a fourth process to establish communication with the compute service manager 104 after a system boot; and a fifth process to handle all communication with a compute cluster for a given job provided by the compute service manager 104 and to communicate information back to the compute service manager 104 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, the data storage devices data storage device 1 108a to data storage device N 108d are decoupled from the computing resources associated with the execution platform 110. This architecture supports dynamic changes to the data platform 102 based on the changing data storage/retrieval needs as well as the changing needs of the users and systems. The support of dynamic changes allows the data platform 102 to scale quickly in response to changing demands on the systems and components within the data platform 102. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The compute service manager 104, metadata database 114, execution platform 110, and database storage 106 are shown in FIG. 1 as individual discrete components. However, each of the compute service manager 104, metadata database 114, execution platform 110, and database storage 106 may be implemented as a distributed system (e.g., distributed across multiple systems/platforms at multiple geographic locations). Additionally, each of the compute service manager 104, metadata database 114, execution platform 110, and database storage 106 can be scaled up or down (independently of one another) depending on changes to the requests received and the changing needs of the data platform 102. Thus, in the described embodiments, the data platform 102 is dynamic and supports regular changes to meet the current data processing needs.

During operation, the data platform 102 processes multiple jobs determined by the compute service manager 104. These jobs are scheduled and managed by the compute service manager 104 to determine when and how to execute the job. For example, the compute service manager 104 may divide the job into multiple discrete tasks and may determine what data is needed to execute each of the multiple discrete tasks. The compute service manager 104 may assign each of the multiple discrete tasks to one or more nodes of the execution platform 110 to process the task. The compute service manager 104 may determine what data is needed to process a task and further determine which nodes within the execution platform 110 are best suited to process the task. Some nodes may have already cached the data needed to process the task and, therefore, be a good candidate for processing the task. Metadata stored in the metadata database 114 assists the compute service manager 104 in determining which nodes in the execution platform 110 have already cached at least a portion of the data needed to process the task. One or more nodes in the execution platform 110 process the task using data cached by the nodes and, if necessary, data retrieved from the database storage 106. It is desirable to retrieve as much data as possible from caches within the execution platform 110 because the retrieval speed is typically faster than retrieving data from the database storage 106.

As shown in FIG. 1, the computing environment 100 separates the execution platform 110 from the database storage 106. In this arrangement, the processing resources and cache resources in the execution platform 110 operate independently of the data storage devices 106-1 to 106-N in the database storage 106. Thus, the computing resources and cache resources are not restricted to specific data storage devices 106-1 to 106-N. Instead, all computing resources and all cache resources may retrieve data from, and store data to, any of the data storage resources in the database storage 106.

Figure 2:
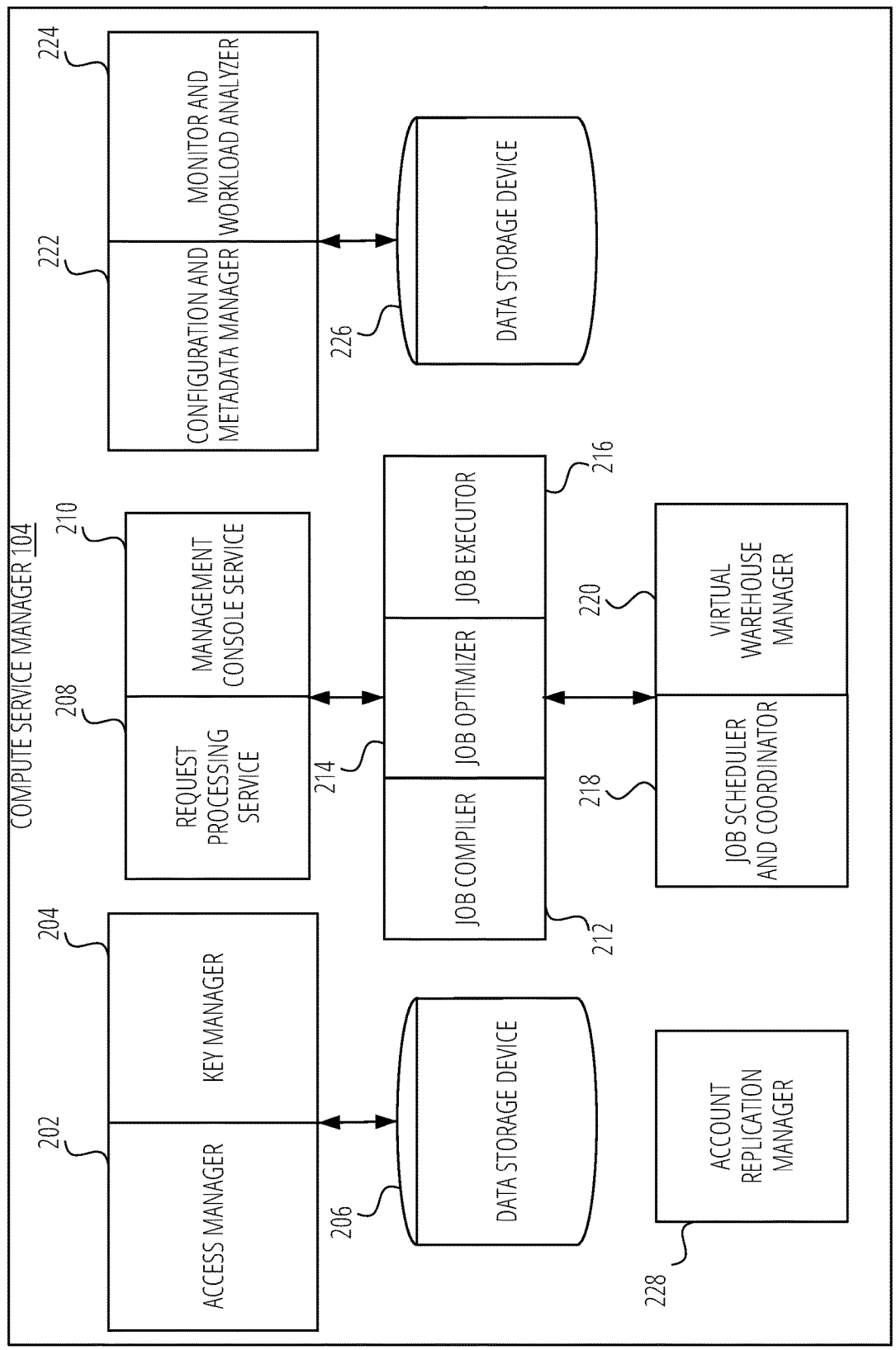
FIG. 2 is a block diagram illustrating components of a compute service manager, in accordance with some embodiments of the present disclosure.

FIG. 2 is a block diagram illustrating components of the compute service manager 104, in accordance with some embodiments of the present disclosure. As shown in FIG. 2, the compute service manager 104 includes an access manager 202 and a key manager 204 coupled to a data storage device 206. Access manager 202 handles authentication and authorization tasks for the systems described herein. Key manager 204 manages storage and authentication of keys used during authentication and authorization tasks. For example, access manager 202 and key manager 204 manage the keys used to access data stored in remote storage devices (e.g., data storage devices in database storage 106). As used herein, the remote storage devices may also be referred to as "persistent storage devices" or "shared storage devices."

A request processing service 208 manages received data storage requests and data retrieval requests (e.g., jobs to be performed on database data). For example, the request processing service 208 may determine the data necessary to process a received query (e.g., a data storage request or data retrieval request). The data may be stored in a cache within the execution platform 110 or in a data storage device in database storage 106.

A management console service 210 supports access to various systems and processes by administrators and other system managers. Additionally, the management console service 210 may receive a request to execute a job and monitor the workload on the system.

The compute service manager 104 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 104.

A job scheduler and coordinator 218 sends received jobs to the appropriate services or systems for compilation, optimization, and dispatch to the execution platform 110. For example, jobs may be prioritized and processed in that prioritized order. In an embodiment, the job scheduler and coordinator 218 determines a priority for internal jobs that are scheduled by the compute service manager 104 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. As discussed below, each virtual warehouse includes multiple execution nodes that each include a cache and a processor.

Additionally, the compute service manager 104 includes a configuration and metadata manager 222, which manages the information related to the data stored in the remote data storage devices and in the local caches (e.g., the caches in execution platform 110). The configuration and metadata manager 222 uses the metadata to determine which data micro-partitions need to be accessed to retrieve data for processing a particular task or job. A monitor and workload analyzer 224 oversees processes performed by the compute service manager 104 and manages the distribution of tasks (e.g., workload) across the virtual warehouses and execution nodes in the execution platform 110. The monitor and workload analyzer 224 also redistributes tasks, as needed, based on changing workloads throughout the data platform 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the data platform 102. For example, data storage device 226 may represent caches in execution platform 110, storage devices in database storage 106, or any other storage device.

As shown, the compute service manager 104 further includes an account replication manager 228. The account replication manager 228 is responsible for handling account replication including automatic replication of security features. Further details regarding the generation of pruning indexes are discussed below.

Figure 3:
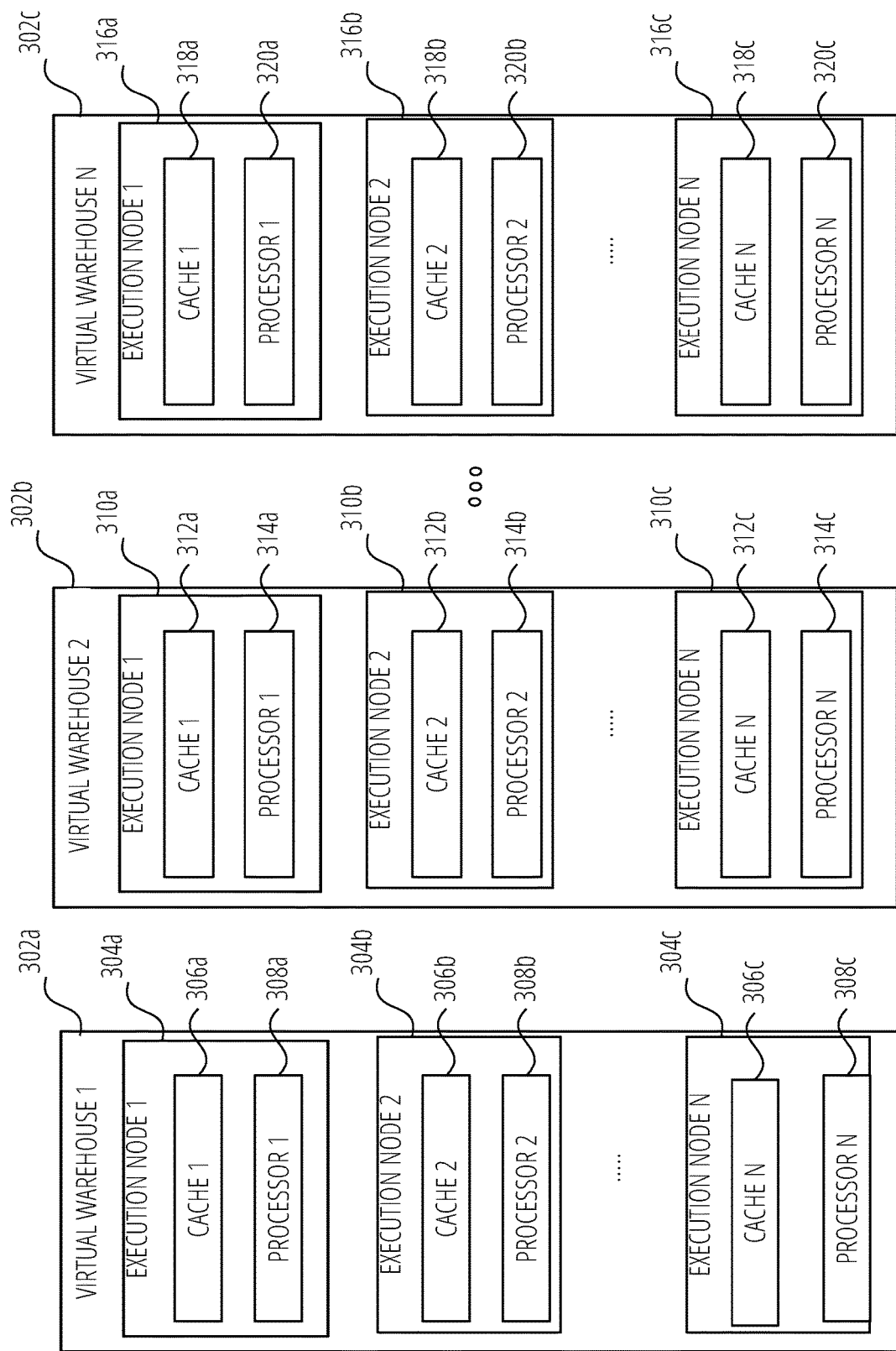
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1 302a, and virtual warehouse 2 302b to virtual warehouse N 302c. Each virtual warehouse includes multiple execution nodes that each includes a data cache and a processor. The virtual warehouses can execute multiple tasks in parallel by using the multiple execution nodes. As discussed herein, the execution platform 110 can add new virtual warehouses and drop existing virtual warehouses in real time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in database storage 106).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 1 to N shown in FIG. 1. Thus, the virtual warehouses are not necessarily assigned to a specific data storage device 1 to N and, instead, can access data from any of the data storage devices 1 to N within the database storage 106. Similarly, each of the execution nodes shown in FIG. 3 can access data from any of the data storage devices 1 to N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 302a includes a plurality of execution nodes as exemplified by execution node 1 304a, execution node 2 304b, and execution node N 304c. Execution node 1 304a includes cache 1 306a and a processor 1 308a. Execution node 2 304b includes cache 2 306b and processor 2 308b. Execution node N 304c includes cache N 306c and processor N 308c. Each execution node 1 to N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 302a discussed above, virtual warehouse 2 302b includes a plurality of execution nodes as exemplified by execution node 1 310a, execution node 2 310b, and execution node N 310c. Execution node 1 304a includes cache 1 312a and processor 1 314a. Execution node 2 310b includes cache 2 312b and processor 2 314b. Execution node N 310c includes cache N 312c and processor N 314c. Additionally, virtual warehouse N 302c includes a plurality of execution nodes as exemplified by execution node 1 316a, execution node 2 316b, and execution node N 316c. Execution node 1 316a includes cache 1 318a and processor 1 320a. Execution node 2 316b includes cache 2 318b and processor 2 320b. Execution node N 316c includes cache N 318c and processor N 320c.

In some embodiments, the execution nodes shown in FIG. 3 are stateless with respect to the data the execution nodes are caching. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in database storage 106. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the database storage 106.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, the virtual warehouses may be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse as shown in FIG. 3 has multiple execution nodes. The multiple execution nodes associated with each virtual warehouse may be implemented using multiple computing systems at multiple geographic locations. For example, an instance of virtual warehouse 1 302*a* implements execution node 1 304*a* and execution node 2 304*b* on one computing platform at a geographic location and implements execution node N 304*c* at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in database storage 106, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
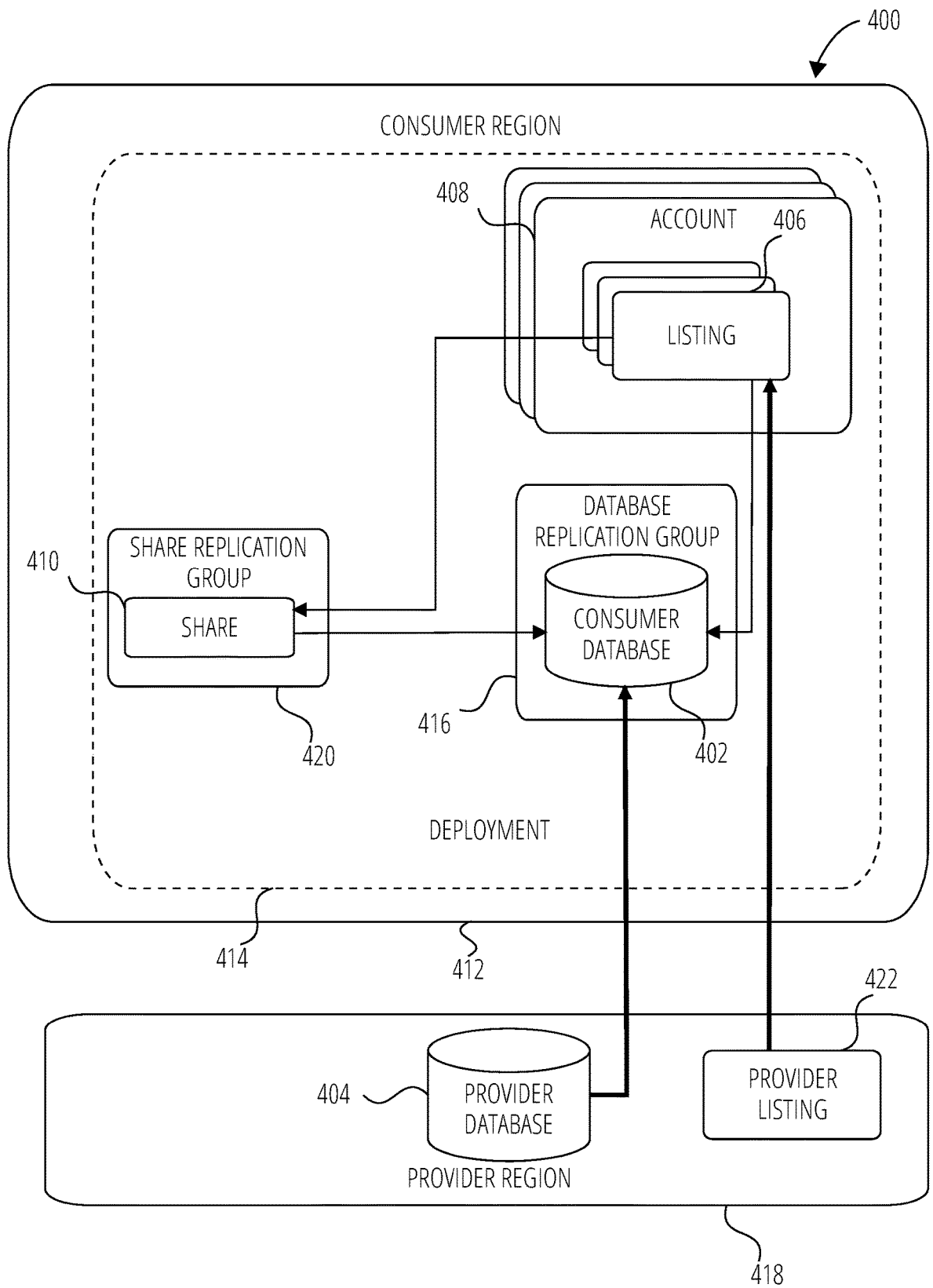
FIG. 4 is a deployment diagram of a database system deployment in accordance with some embodiments of the present disclosure.

FIG. 4 is a deployment diagram of a database system deployment 400 in accordance with some embodiments of the present disclosure. A provider region 418 includes a provider database 404 that is maintained by a data provider. A consumer region 412 includes a consumer database 402 which is a replica of the provider database 404 in the provider region 418. The consumer database 402 may be a complete copy of the provider database 404 or may include one or more slices of the provider database 404. The provider region includes a provider listing 422 that is maintained by the data provider. The provider listing includes a listing of the data services that are provided in conjunction with the provider database 404. The consumer region 412 includes a listing 406 which is a replica of the provider listing 422.

The consumer region 412 includes one or more accounts, such as account 408. The one or more accounts are associated with one or more respective consumers of the data provided by the provider associated with the provider database 404. An account of the one or more accounts includes one or more listings, such as the listing 406 of account 408. A listing may include metadata describing the shared data. A listing points to one or more databases, such as consumer database 402 and one or more shares, such as share 410, that are associated with a database. Share 410 includes grant metadata describing access grants made to the consumer database 402 for the one or more consumers of the consumer region 412. The share 410 is an object that acts as a wrapper or a container around the database 402. The share 410 includes multiple objects and can be shared with various users, which grants those users access to those objects. The share 410 acts as an access-control (including, e.g., visibility control) container for the consumer database 402. In various different embodiments, only entities that have had a given share shared with them are able to see and access whatever one or more objects, such as database 402, that are associated by that given share.

A component of a database system, such as compute service manager 104 of FIG. 1, creates a deployment 414 of the consumer database 402 and the share 410 associated with the consumer database 402 during execution of a fulfillment task associated with the listing 406. In some embodiments, during the fulfillment task, the compute service manager 104 creates a deployment 414 of initial versions of the consumer database 402 and the share 410 for use by a consumer associated with the account 408. The compute service manager 104 generates a replica database in the deployment 414 and copies data of provider database 404 to the replica database. The compute service manager 104 generates share 410 based on the consumer database 402. The compute service manager 104 links the replica database as consumer database 402 to the listing 406 and links the share 410 to the listing 406. Embodiments of a fulfillment task are more fully described in FIG. 6.

To maintain the consumer database 402, the compute service manager 104 executes a refresh task based on a refresh schedule maintained by a job scheduler and coordinator 218 of the compute service manager 104. In some embodiments, during a refresh task, the compute service manager 104 operates on replication groups of shares and databases, such as share replication group 420 and database replication group 416. The shares and databases of a consumer region are grouped into replication groups to facilitate refreshing the databases and shares in an orderly and consistent manner. To refresh the consumer database 402 of the database replication group 416 based on the provider database 404, the compute service manager 104 generates a replica database in the deployment 414 and copies data of the provider database 404 to the replica database. The compute service manager 104 generates a replica share based on the consumer database 402. The compute service manager 104 links the listing 406 to the replica share as share 410 and links the replica database to the listing 406 as consumer database 402. Embodiments of a refresh task are more fully described in FIG. 7.

Figure 5:
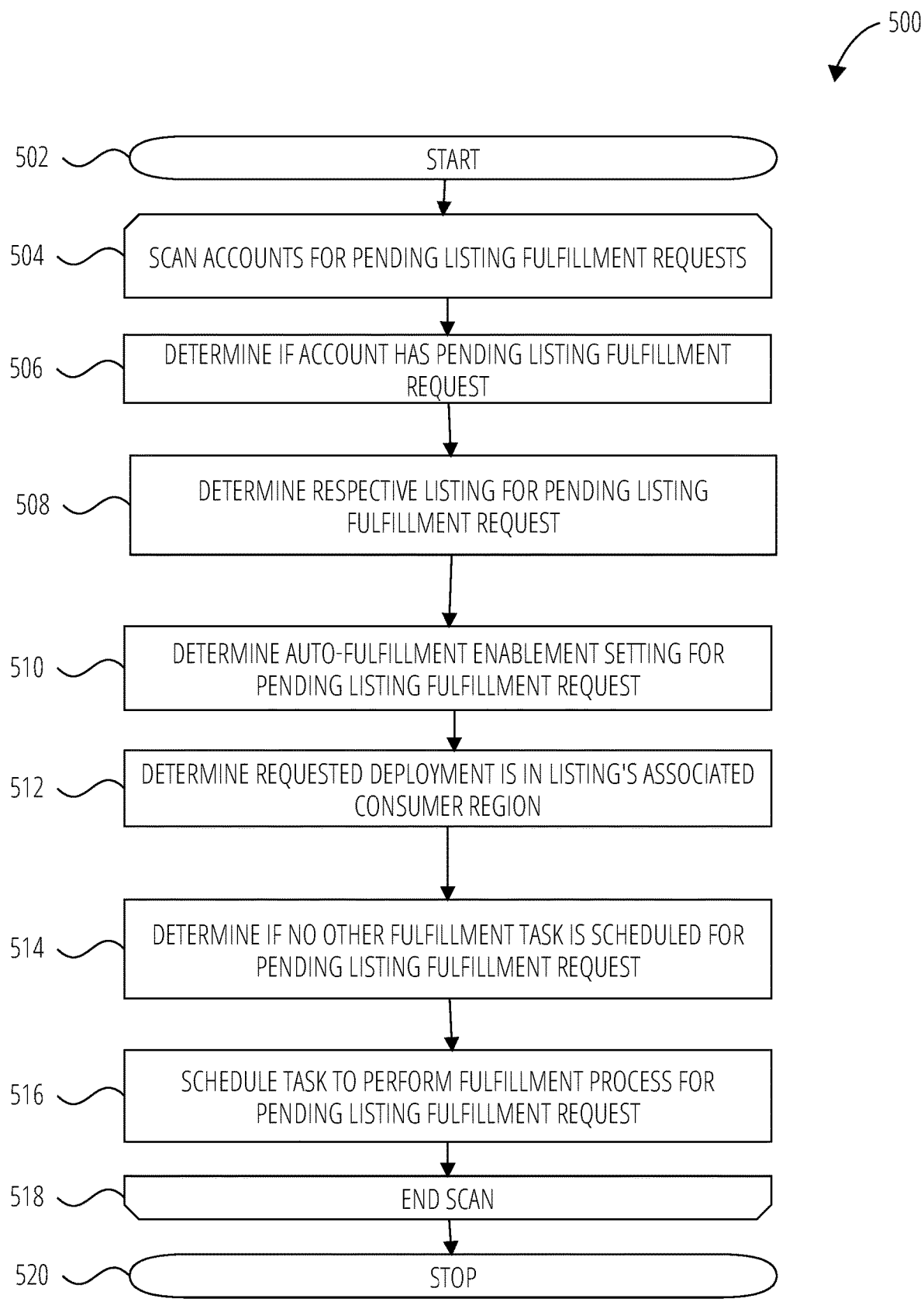
FIG. 5 is an activity diagram of a background fulfillment task in accordance with some embodiments of the present disclosure.

FIG. 5 is an activity diagram of a background fulfillment task 500 in accordance with some embodiments of the present disclosure. In operation 502, a compute service manager, such as compute service manager 104 of FIG. 1, starts execution of the background fulfillment task 500. In operation 504, the compute service manager 104 scans one or more accounts, such as account 408 of FIG. 4, of a consumer region, such consumer region 412 of FIG. 4, for pending listing fulfillment requests. In operation 506, the compute service manager 104 determines if the account 408 has a pending listing fulfillment request based on account data of the account 408. In operation 508, on the basis of determining that the account 408 has a pending listing fulfillment request, the compute service manager 104 determines a respective listing, such as listing 406 of FIG. 4, for the pending listing fulfillment request based on listing data of the account 408. A listing request includes a request for deployment of a consumer database, such as consumer database 402, and the consumer database's associated share, such as share 410 of FIG. 4, based on a provider database, such as provider database 404, in a requested consumer region, such as consumer region 412. In operation 510, the compute service manager 104 determines an enablement of auto-fulfillment for the pending listing fulfillment request based on auto-fulfillment setting data of the account 408.

In operation 512, on the basis of determining that auto-fulfillment is enabled for the pending listing fulfillment request, the compute service manager 104 determines if the requested deployment of the pending listing fulfillment request is for a consumer region associated with the account of the listing request. In some embodiments, a provider makes a listing available in a subset of a set of consumer regions that are serviced by the provider. In operation 514, on the basis of determining that the requested deployment of the pending listing fulfillment request is in a consumer region associated with the account of the pending listing fulfillment request, the compute service manager 104 determines if no other fulfillment task is scheduled for the pending listing fulfillment request based on scheduling data maintained by the job scheduler and coordinator 218 of FIG. 2. On the basis of determining that no other fulfillment task is scheduled for the pending listing fulfillment request, in operation 516, the compute service manager 104 schedules a fulfillment task, such as fulfillment task 600 of FIG. 6, to perform a fulfillment process for the pending listing fulfillment request. The compute service manager 104 continues scanning the accounts for pending listing fulfillment requests until in operation 518 the compute service manager 104 determines that there are no more accounts to scan and in operation 520 the compute service manager 104 stops the background fulfillment task 500.

Figure 6:
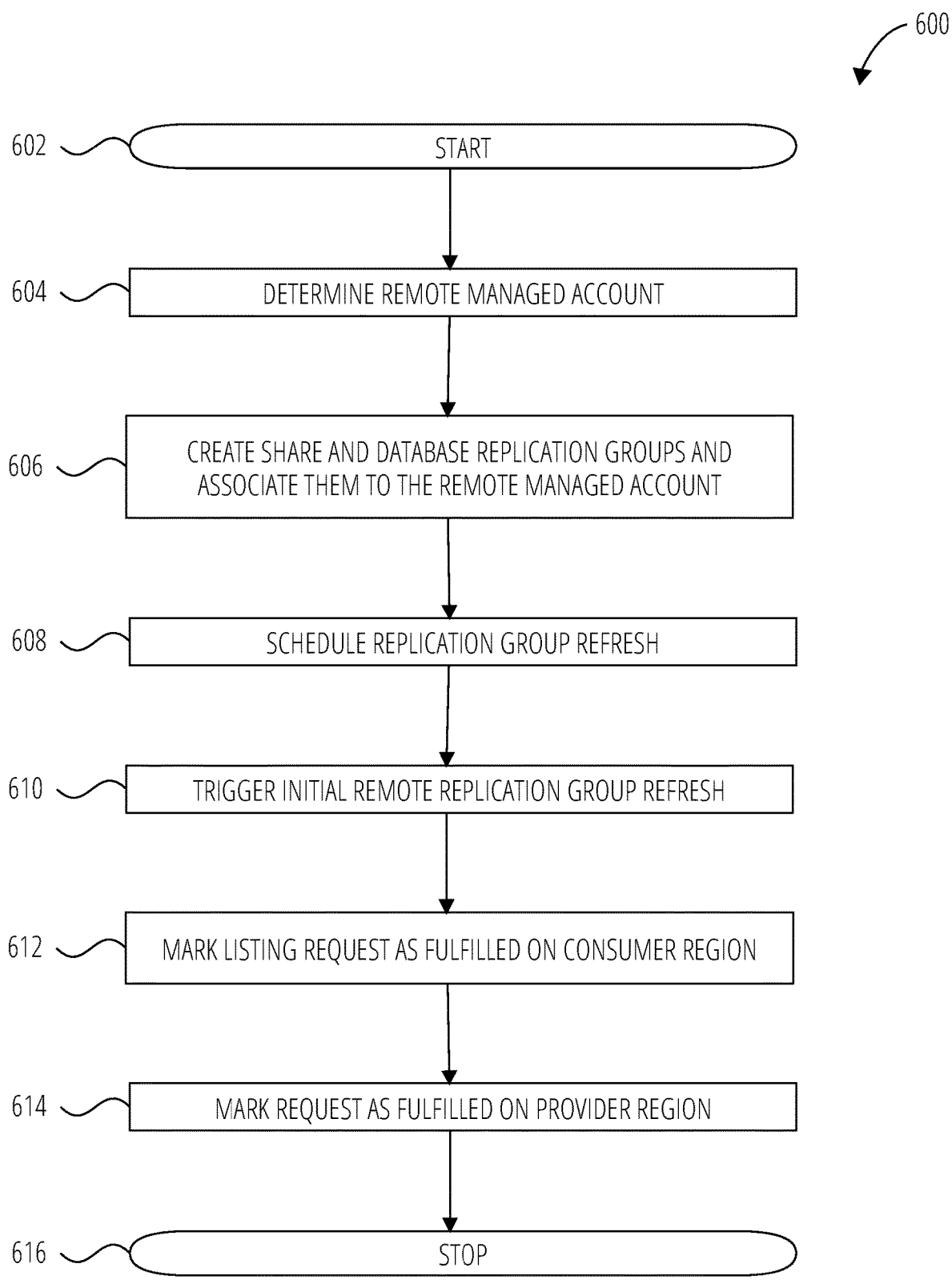
FIG. 6 is an activity diagram of a fulfillment task in accordance with some embodiments of the present disclosure.

FIG. 6 is an activity diagram of a fulfillment task 600 in accordance with some embodiments of the present disclosure. A compute service manager, such as compute service manager 104 of FIG. 1, executes the fulfillment task 600 in order to deploy a requested deployment, such as deployment 414 of FIG. 4, in a consumer region, such as consumer region 412 of FIG. 4, of a pending listing fulfillment request of an account, such as account 408 of FIG. 4. In operation 602, the compute service manager 104 of FIG. 1 starts execution of the fulfillment task 600. In operation 604, the compute service manager 104 determines if a remote managed account already exists for the consumer region 412. On the basis of determining that a remote managed account exists on the consumer region 412, the compute service manager 104 uses the existing remote managed account. On the basis of determining that a remote managed account does not exist in the consumer region 412, the compute service manager 104 creates a remote managed account in the consumer region 412. In operation 606, the compute service manager 104 creates a share replication group, such as share replication group 420 of FIG. 4, and associates the share replication group 420 with the remote managed account. The share replication group 420 includes a share, such as share 410 of FIG. 4, that will be created in accordance with the fulfillment task 600. The compute service manager 104 creates a database replication group, such as database replication group 416 of FIG. 4, and associates the database replication group with the remote managed account. The database replication group 416 includes a database, such as consumer database 402, that will be created in accordance with the fulfillment task 600. In some embodiments, a database replication group includes one or more databases. In additional embodiments, a share replication group includes one or more shares.

In operation 608, the compute service manager 104 schedules a remote replication group refresh of the share replication group 420 and the database replication group 416 of the consumer region 412 with a job scheduler, such as job scheduler and coordinator 218 of FIG. 2. The replication group refresh is performed by an automated refresh task, such as automated replication group refresh task 700 of FIG.

7. In operation 610, the compute service manager 104 triggers an initial remote replication group refresh of the database replication group 416 and the share replication group 420 by the automated refresh task. During the initial remote replication group refresh, the automated refresh task creates the consumer database 402 based on a provider database, such as provider database 404 of a provider region, such as provider region 418 of FIG. 4, and generates an initial share 410 in the consumer region 412 based on the consumer database 402. In operation 612, the compute service manager 104 marks the pending listing fulfillment request as fulfilled in the consumer region 412 where the requested deployment 414 is created. In operation 614, the compute service manager 104 marks the pending listing fulfillment request as fulfilled in the provider region 418. In operation 616, the compute service manager 104 stops execution of the fulfillment task 600.

In some embodiments, the database replication group and the share replication group are the same replication group.

Figure 7:
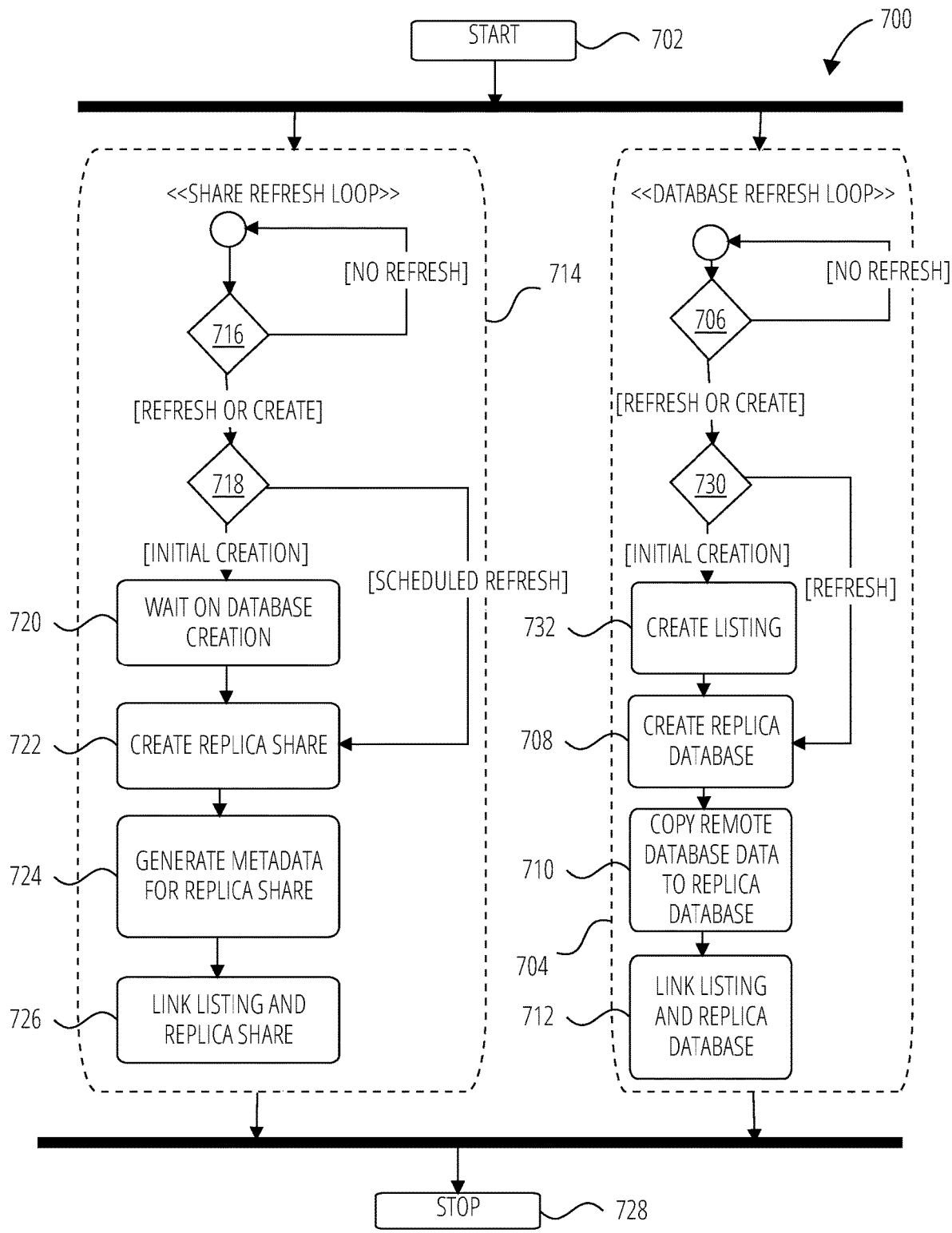
FIG. 7 is an activity diagram of an automated replication group refresh task in accordance with some embodiments of the present disclosure.

FIG. 7 is an activity diagram of an automated replication group refresh task 700 in accordance with some embodiments of the present disclosure. A compute service manager, such as compute service manager 104 of FIG. 1, continuously executes the automated replication group refresh task 700 based on a schedule maintained by a scheduler, such as job scheduler and coordinator 218 of FIG. 2. The compute service manager 104 executes the automated replication group refresh task 700 in order to refresh a consumer database, such as consumer database 402 of FIG. 4, and associated shares, such as share 410 of FIG. 4, in a consumer region, such as consumer region 412 of FIG. 4, based on a schedule.

In addition, the compute service manager 104 executes the automated replication group refresh task 700 to create initial copies of the consumer database 402 and of the associated share 410 based on a provider database 404 of FIG. 4 of a provider region 418 of FIG. 4. The consumer database 402 and share 410 are included in a deployment 414 that results from a listing fulfillment request associated with a listing, such as listing 406 of FIG. 4, associated with an account, such as account 408 of FIG. 4.

Once started in operation 702, the automated replication group refresh task 700 includes two continuous loops, a share refresh loop 714 that the compute service manager 104 executes to create initial shares and refresh existing shares, and a database refresh loop 704 that the compute service manager 104 executes to create initial consumer databases and refresh existing consumer databases.

In operation 706 of database refresh loop 704, the compute service manager 104 determines if the consumer database 402 should be initially created or refreshed. On the basis that the compute service manager 104 determines that the consumer database 402 is not to be initially created or refreshed, the compute service manager 104 performs no operation and continues to loop.

On the basis of determining by the compute service manager 104 to initially create or refresh the consumer database 402, the compute service manager 104 proceeds to initially create or refresh the consumer database 402. For example, the compute service manager 104 may determine that the consumer database 402 should be initially created on the basis of detecting a trigger of an initial remote replication group refresh of a database replication group during a fulfillment task, such as fulfillment task 600 of FIG. 6. In another example, the compute service manager 104 may determine to refresh the consumer database 402 based on a schedule maintained by a scheduler, such as job scheduler and coordinator 218 of FIG. 2.

To initially create or refresh the consumer database 402, on the basis of determining that the consumer database 402 is to be initially created or refreshed, in operation 730 the compute service manager 104 determines if the consumer database 402 is being initially created or if the consumer database 402 is being refreshed. On the basis of determining that the consumer database 402 is being initially created, in operation 732 the compute service manager 104 creates the listing 406 for account 408 based on the provider listing 422 in the provider region 418. On the basis of determining that the consumer database 402 is to be refreshed based on a scheduled refresh, the compute service manager 104 skips operation 732.

In operation 708, the compute service manager 104 creates a replica database in the consumer region 412. In operation 710, the compute service manager 104 copies data of the provider database 404 into the replica database. In operation 712, the compute service manager 104 links the replica database to the listing 406 as consumer database 402.

In some embodiments, during a refresh of the consumer database 402, the compute service manager 104 also refreshes the listing 406 based on the provider listing 422.

In operation 716 of database share refresh loop 714, the compute service manager 104 determines if the share 410 should be initially created or refreshed. On the basis that the compute service manager 104 determines that the share 410 is not to be initially created or refreshed, the compute service manager 104 performs no operation and continues to loop.

On the basis of the compute service manager 104 determining that the share 410 should be initially created or refreshed, the compute service manager 104 proceeds to initially create or refresh the share 410. For example, the compute service manager 104 may determine that the share 410 should be initially created on the basis of detecting a trigger of an initial remote replication group refresh of a share replication group during a fulfillment task, such as fulfillment task 600 of FIG. 6. In another example, the compute service manager 104 may determine that the share 410 should be refreshed based on a schedule maintained by a scheduler, such as job scheduler and coordinator 218 of FIG. 2.

On the basis of determining that the share 410 should be initially created or refreshed, in operation 718 the compute service manager 104 determines if the share 410 should be initially created or refreshed, On the basis of determining that the share 410 should be initially created, in operation 720 the compute service manager 104 waits on the initial creation of the consumer database 402 being created by the database refresh loop 704 as the data of the share 410 is generated based on the consumer database 402. On the basis of determining that the share 410 is to be refreshed based on a scheduled refresh, the compute service manager 104 skips operation 720.

To initially create or refresh the share 410, in operation 722, the compute service manager 104 creates a replica share in the consumer region 412. In operation 724, the compute service manager 104 generates the metadata for the share 410 based on the consumer database 402. In operation 726 the compute service manager 104 links the replica share to the listing 406 as the share 410.

In operation 728, the compute service manager 104 ceases execution of the automated replication group refresh task 700.

In some embodiments, a database replication group includes one or more databases. In additional embodiments, a share replication group includes one or more shares.

Described implementations of the subject matter can include one or more features, alone or in combination as illustrated below by way of example.

Example 1 is a computer-implemented method comprising: scanning one or more accounts of a consumer region of the data platform for a pending listing fulfillment request, the pending listing request including a request for deployment of a consumer database and an associated share of grant metadata of the consumer database within the consumer region, the consumer database based on a provider database in a provider region; determining, on the basis of determining that an account of the one or more accounts has a pending listing fulfillment request, a listing for the pending listing fulfillment request based on listing data of the account, and scheduling, on the basis of determining that no other fulfillment task is scheduled for the pending listing fulfillment request, a fulfillment task to perform a fulfillment process for the pending listing fulfillment request.

Example 2 includes the computer-implemented method of Example 1, further comprising: creating a share replication group, the share replication group including the share; associating the share replication group with a remote managed account of the consumer region; creating a database replication group, the database replication group including the consumer database; and associating the database replication group with the remote managed account of the consumer region.

Example 3 includes the method of any one or more of Examples 1 or 2, further comprising triggering an initial remote replication group refresh of the database replication group and the share replication group.

Example 4 includes the method of any one or more of Examples 1 to 3, further comprising: marking the pending listing fulfillment request as fulfilled in the consumer region; and marking the pending listing fulfillment request as fulfilled in the provider region.

Example 5 includes the method of any one or more of Examples 1 to 4, further comprising: creating, on the basis of detecting the triggering of the initial remote replication group refresh of the database replication group, the consumer database in the consumer region based on the provider database in the provider region; linking the consumer database to the listing; creating, on the basis of detecting the triggering of the initial remote replication group refresh of the share replication group, the share based on the consumer database in the consumer region; and linking the share to the listing.

Example 6 includes the method of any one or more of Examples 1 to 5, further comprising scheduling a refresh of the database replication group.

Example 7 includes the method of any one or more of Examples 1 to 6, further comprising: performing, on the basis of determining to refresh the consumer database based on a schedule maintained by a scheduler, operations comprising: creating a replica database in the consumer region; copying data of the provider database into the replica database; and linking the replica database as the consumer database to the listing.

Example 8 includes the method of any one or more of Examples 1 to 7, further comprising scheduling a refresh of the share replication group refresh.

Example 9 includes the method of any one or more of Examples 1 to 8, further comprising: performing, on the basis of determining to refresh the share based on a schedule maintained by a scheduler, the following operations: creating a replica share in the consumer region; generating data of the share based on the consumer database; and linking the replica share to the listing.

Example 10 includes the method of any one or more of Examples 1 to 9, wherein the database replication group and the share replication group are a same replication group.

Example 11. A system comprising: one or more processors of a machine; and at least one memory storing instructions that, when executed by the one or more processors, cause the machine to perform operations implementing any one of example methods 1 to 10.

Example 12. A machine-readable storage device embodying instructions that, when executed by a machine, cause the machine to perform operations implementing any one of example methods 1 to 10.

Figure 8:
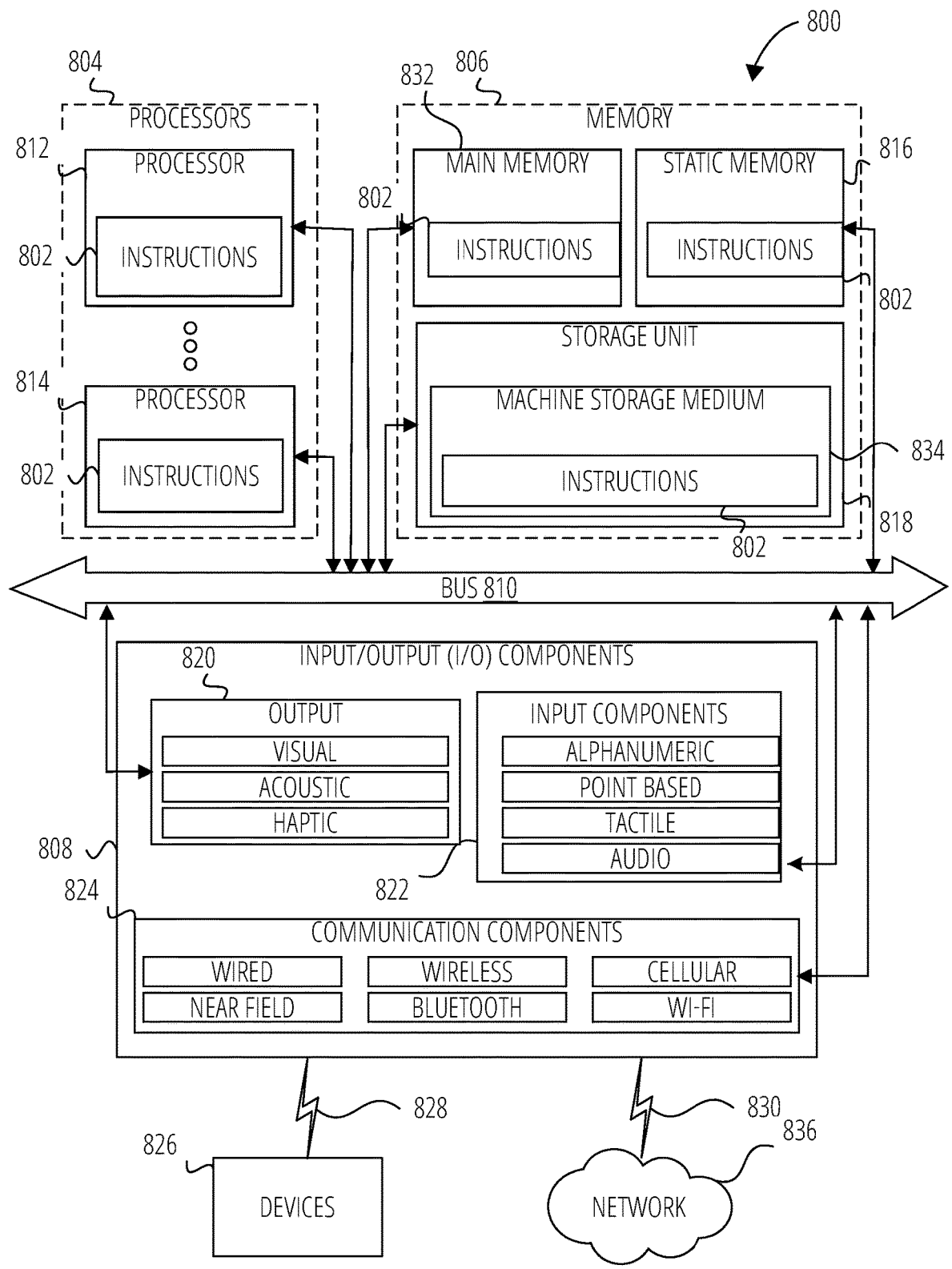
FIG. 8 illustrates a diagrammatic representation of a machine in the form of a computer system within which a set of instructions may be executed for causing the machine to perform any one or more of the methodologies discussed herein, in accordance with some embodiments of the present disclosure.

FIG. 8 illustrates a diagrammatic representation of a machine 800 in the form of a computer system within which a set of instructions may be executed for causing the machine 800 to perform any one or more of the methodologies discussed herein, according to example embodiments. Specifically, FIG. 8 shows a diagrammatic representation of the machine 800 in the example form of a computer system, within which instructions 802 (e.g., software, a program, an application, an applet, an app, or other executable code) for causing the machine 800 to perform any one or more of the methodologies discussed herein may be executed. For example, the instructions 802 may cause the machine 800 to execute any one or more operations of any one or more of the methods described herein. In this way, the instructions 802 transform a general, non-programmed machine into a particular machine 800 (e.g., the compute service manager 104, the execution platform 110, and the data storage devices 1 to N of database storage 106) that is specially configured to carry out any one of the described and illustrated functions in the manner described herein.

In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 802, sequentially or otherwise, that specify actions to be taken by the machine 800. Further, while only a single machine 800 is illustrated, the term "machine" shall also be taken to include a collection of machines that individually or jointly execute the instructions 802 to perform any one or more of the methodologies discussed herein.

The machine 800 includes processors 804, memory 806, and I/O components 808 configured to communicate with each other such as via a bus 810. In an example embodiment, the processors 804 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, multiple processors as exemplified by processor 812 and a processor 814 that may execute the instructions 802. The term "processor" is intended to include multi-core processors that may comprise two or more independent processors (sometimes referred to as "cores") that may execute instructions 802 contemporaneously. Although FIG. 8 shows multiple processors 804, the machine 800 may include a single processor with a single core, a single processor with multiple cores (e.g., a multi-core processor), multiple processors with a single core, multiple processors with multiple cores, or any combination thereof.

The memory 806 may include a main memory 832, a static memory 816, and a storage unit 818 including a machine storage medium 834, all accessible to the processors 804 such as via the bus 810. The main memory 832, the static memory 816, and the storage unit 818 store the instructions 802 embodying any one or more of the methodologies or functions described herein. The instructions 802 may also reside, completely or partially, within the main memory 832, within the static memory 816, within the storage unit 818, within at least one of the processors 804 (e.g., within the processor's cache memory), or any suitable combination thereof, during execution thereof by the machine 800.

The input/output (I/O) components 808 include components to receive input, provide output, produce output, transmit information, exchange information, capture measurements, and so on. The specific I/O components 808 that are included in a particular machine 800 will depend on the type of machine. For example, portable machines such as mobile phones will likely include a touch input device or other such input mechanisms, while a headless server machine will likely not include such a touch input device. It will be appreciated that the I/O components 808 may include many other components that are not shown in FIG. 8. The I/O components 808 are grouped according to functionality merely for simplifying the following discussion and the grouping is in no way limiting. In various example embodiments, the I/O components 808 may include output components 820 and input components 822. The output components 820 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 822 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 808 may include communication components 824 operable to couple the machine 800 to a network 836 or devices 826 via a coupling 830 and a coupling 828, respectively. For example, the communication components 824 may include a network interface component or another suitable device to interface with the network 836. In further examples, the communication components 824 may include wired communication components, wireless communication components, cellular communication components, and other communication components to provide communication via other modalities. The devices 826 may be another machine or any of a wide variety of peripheral devices (e.g., a peripheral device coupled via a universal serial bus (USB)). For example, as noted above, the machine 800 may correspond to any one of the compute service manager 104, the execution platform 110, and the devices 826 may include the data storage device 226 or any other computing device described herein as being in communication with the data platform 102 or the database storage 106.

The various memories (e.g., 806, 816, 832, and/or memory of the processor(s) 804 and/or the storage unit 818) may store one or more sets of instructions 802 and data structures (e.g., software) embodying or utilized by any one or more of the methodologies or functions described herein. These instructions 802, when executed by the processor(s) 804, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 836 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 836 or a portion of the network 836 may include a wireless or cellular network, and the coupling 830 may be a Code Division Multiple Access (CDMA) connection, a Global System for Mobile communications (GSM) connection, or another type of cellular or wireless coupling. In this example, the coupling 830 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 802 may be transmitted or received over the network 836 using a transmission medium via a network interface device (e.g., a network interface component included in the communication components 824) and utilizing any one of a number of well-known transfer protocols (e.g., hypertext transfer protocol (HTTP)). Similarly, the instructions 802 may be transmitted or received using a transmission medium via the coupling 828 (e.g., a peer-to-peer coupling) to the devices 826. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 802 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methodologies disclosed herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A data platform comprising:
   at least one processor; and
   at least one memory storing instructions that cause the at least one processor to perform operations comprising:
   scanning one or more accounts of a consumer region of the data platform for a pending listing fulfillment request, the pending listing request including a request for deployment of a consumer database and a share of grant metadata describing access grants made to the consumer database within the consumer region, the consumer database based on a provider database in a provider region;
   determining, on the basis of determining that an account of the one or more accounts has a pending listing fulfillment request, a listing for the pending listing fulfillment request based on listing data of the account, and
   scheduling, on the basis of determining that no other fulfillment task is scheduled for the pending listing fulfillment request, a fulfillment task to perform a fulfillment process for the pending listing fulfillment request.

2. The data platform of claim 1, wherein the instructions further cause the at least one processor to perform operations comprising:
   creating a share replication group, the share replication group including the share;
   associating the share replication group with a remote managed account of the consumer region;
   creating a database replication group, the database replication group including the consumer database; and
   associating the database replication group with the remote managed account of the consumer region.

3. The data platform of claim 2, wherein the instructions further cause the at least one processor to perform operations comprising:
   triggering an initial remote replication group refresh of the database replication group and the share replication group.

4. The data platform of claim 3, wherein the instructions further cause the at least one processor to perform operations comprising:
marking the pending listing fulfillment request as fulfilled in the consumer region; and
marking the pending listing fulfillment request as fulfilled in the provider region.

5. The data platform of claim 3, wherein the instructions further cause the at least one processor to perform operations comprising:
creating, on the basis of detecting the triggering of the initial remote replication group refresh of the database replication group, the consumer database in the consumer region based on the provider database in the provider region;
linking the consumer database to the listing;
creating, on the basis of detecting the triggering of the initial remote replication group refresh of the share replication group, the share based on the consumer database in the consumer region; and
linking the share to the listing.

6. The data platform of claim 2, wherein the instructions further cause the at least one processor to perform operations comprising:
scheduling a refresh of the database replication group.

7. The data platform of claim 6, wherein the instructions further cause the at least one processor to perform operations comprising:
performing, on the basis of determining to refresh the consumer database based on a schedule maintained by a scheduler, operations comprising:
creating a replica database in the consumer region;
copying data of the provider database into the replica database; and
linking the replica database as the consumer database to the listing.

8. The data platform of claim 2, wherein the instructions further cause the at least one processor to perform operations comprising:
schedule a refresh of the share replication group.

9. The data platform of claim 8, wherein the instructions further cause the at least one processor to perform operations comprising:
performing, on the basis of determining to refresh the share based on a schedule maintained by a scheduler, operations comprising:
creating a replica share in the consumer region;
generating data of the share based on the consumer database; and
linking the replica share to the listing as the share.

10. The data platform of claim 2, wherein the database replication group and the share replication group are a same replication group.

11. A computer-implemented method, comprising:
scanning one or more accounts of a consumer region of a data platform for a pending listing fulfillment request, the pending listing request including a request for deployment of a consumer database and a share of grant metadata describing access grants made to the consumer database within the consumer region, the consumer database based on a provider database in a provider region;
determining, on the basis of determining that an account of the one or more accounts has a pending listing fulfillment request, a listing for the pending listing fulfillment request based on listing data of the account, and scheduling, on the basis of determining that no other fulfillment task is scheduled for the pending listing fulfillment request, a fulfillment task to perform a fulfillment process for the pending listing fulfillment request.

12. The computer-implemented method of claim 11, further comprising:
creating a share replication group, the share replication group including the share;
associating the share replication group with a remote managed account of the consumer region;
creating a database replication group, the database replication group including the consumer database; and
associating the database replication group with the remote managed account of the consumer region.

13. The computer-implemented method of claim 12, further comprising:
triggering an initial remote replication group refresh of the database replication group and the share replication group.

14. The computer-implemented method of claim 13, further comprising:
marking the pending listing fulfillment request as fulfilled in the consumer region; and
marking the pending listing fulfillment request as fulfilled in the provider region.

15. The computer-implemented method of claim 13, further comprising:
creating, on the basis of detecting the triggering of the initial remote replication group refresh of the database replication group, the consumer database in the consumer region based on the provider database in the provider region;
linking the consumer database to the listing;
creating, on the basis of detecting the triggering of the initial remote replication group refresh of the share replication group, the share based on the consumer database in the consumer region; and
linking the share to the listing.

16. The computer-implemented method of claim 12, further comprising:
scheduling a refresh of the database replication group.

17. The computer-implemented method of claim 16, further comprising:
performing, on the basis of determining to refresh the consumer database based on a schedule maintained by a scheduler, operations comprising:
creating a replica database in the consumer region;
copying data of the provider database into the replica database; and
linking the replica database as the consumer database to the listing.

18. The computer-implemented method of claim 17, further comprising:
scheduling a refresh of the share replication group.

19. The computer-implemented method of claim 18, further comprising:
performing, on the basis of determining to refresh the share based on a schedule maintained by a scheduler, operations comprising:
creating a replica share in the consumer region;
generating data of the share based on the consumer database; and
linking the replica share to the listing.

20. The computer-implemented method of claim 12, wherein the database replication group and the share replication group are a same replication group.

21. A non-transitory computer-storage medium comprising instructions that, when executed by one or more processors of a machine, configure the machine to perform operations comprising:
scanning one or more accounts of a consumer region of the data platform for a pending listing fulfillment request, the pending listing request including a request for deployment of a consumer database and a share of grant metadata of the consumer database within the consumer region, the consumer database based on a provider database in a provider region;
determining, on the basis of determining that an account of the one or more accounts has a pending listing fulfillment request, a listing for the pending listing fulfillment request based on listing data of the account; and
scheduling, on the basis of determining that no other fulfillment task is scheduled for the pending listing fulfillment request, a fulfillment task to perform a fulfillment process for the pending listing fulfillment request.

22. The non-transitory computer-storage medium of claim 21, wherein the instructions further configure the machine to perform operations comprising:
creating a share replication group, the share replication group including the share;
associating the share replication group with a remote managed account of the consumer region;
creating a database replication group, the database replication group including the consumer database; and
associating the database replication group with the remote managed account of the consumer region.

23. The non-transitory computer-storage medium of claim 22, wherein the instructions further configure the machine to perform operations comprising:
triggering an initial remote replication group refresh of the database replication group and the share replication group.

24. The non-transitory computer-storage medium of claim 23, wherein the instructions further configure the machine to perform operations comprising:
marking the pending listing fulfillment request as fulfilled in the consumer region; and
marking the pending listing fulfillment request as fulfilled in the provider region.

25. The non-transitory computer-storage medium of claim 23, wherein the instructions further configure the machine to perform operations comprising:
creating, on the basis of detecting the triggering of the initial remote replication group refresh of the database replication group, the consumer database in the consumer region based on the provider database in the provider region;
linking the consumer database to the listing;
creating, on the basis of detecting the triggering of the initial remote replication group refresh of the share replication group, the share based on the consumer database in the consumer region; and
linking the share to the listing.

26. The non-transitory computer-storage medium of claim 22, wherein the instructions further configure the machine to perform operations comprising:
scheduling a refresh of the database replication group.

27. The non-transitory computer-storage medium of claim 26, wherein the instructions further configure the machine to perform operations comprising:
performing, on the basis of determining to refresh the consumer database based on a schedule maintained by a scheduler, operations comprising:
creating a replica database in the consumer region;
copying data of the provider database into the replica database; and
linking the replica database as the consumer database to the listing.

28. The non-transitory computer-storage medium of claim 27, wherein the instructions further configure the machine to perform operations comprising:
scheduling a refresh of the share replication group refresh.

29. The non-transitory computer-storage medium of claim 28, wherein the instructions further configure the machine to perform operations comprising:
performing, on the basis of determining to refresh the share based on a schedule maintained by a scheduler, the following operations:
creating a replica share in the consumer region;
generating data of the share based on the consumer database; and
linking the replica share to the listing.

30. The non-transitory computer-storage medium of claim 22, wherein the instructions further configure the machine to perform operations comprising, wherein the database replication group and the share replication group are a same replication group.

* * * * *